United States Patent
Novak et al.

(10) Patent No.: US 12,533,740 B2
(45) Date of Patent: Jan. 27, 2026

(54) ACCESSORIES FOR OSCILLATING POWER TOOLS

(71) Applicant: BLACK & DECKER INC., New Britain, CT (US)

(72) Inventors: Joseph T. Novak, East Longmeadow, MA (US); Matthew Christopher Green, Amherst, MA (US); Andrew Reist, Springfield, MA (US); Kevin Howe, Ludlow, MA (US)

(73) Assignee: BLACK & DECKER INC.

(*) Notice: Subject to any disclaimer, the term of this patent is extended or adjusted under 35 U.S.C. 154(b) by 508 days.

(21) Appl. No.: 17/457,768

(22) Filed: Dec. 6, 2021

(65) Prior Publication Data

US 2022/0184721 A1    Jun. 16, 2022

Related U.S. Application Data

(60) Provisional application No. 63/124,298, filed on Dec. 11, 2020.

(51) Int. Cl.
*B23D 61/00* (2006.01)
*B25F 3/00* (2006.01)

(52) U.S. Cl.
CPC ............ *B23D 61/006* (2013.01); *B25F 3/00* (2013.01)

(58) Field of Classification Search
CPC ...... B23D 61/006; B23D 61/02; B23D 61/18; B23D 61/23; B23D 59/002; B23D 51/006;

(Continued)

(56) References Cited

U.S. PATENT DOCUMENTS 7,744,616 B2 * 6/2010 O'Donoghue ....... A61B 17/142
                                                606/177
9,522,007 B2 * 12/2016 Servidio ............. A61B 17/142

(Continued)

FOREIGN PATENT DOCUMENTS

DE         19613538 C1 *  7/1997   .......... B23D 61/006
DE      202013004984 U1    5/2014

(Continued)

OTHER PUBLICATIONS

Extended European Search Report, EP Application No. 21213108.0, May 2, 2022, 8 pages, EPO.

*Primary Examiner* — Ghassem Alie
(74) *Attorney, Agent, or Firm* — Dickinson Wright PLLC

(57) ABSTRACT

An accessory includes an attachment portion with a central opening configured to be coupled to an oscillating power tool and defining a first axis generally parallel to a power tool axis. An intermediate portion with a first side edge and a second side edge has a proximal end portion coupled to the attachment portion and extends away from the attachment portion to a distal end portion. A working portion is coupled to and extends away from a distal end portion at an angle to the intermediate portion and at an angle to the first axis. The working end portion has a non-cutting third side edge continuous with the first side edge and a cutting fourth side edge continuous with the second side edge. The intermediate portion wraps at least partially around an obstruction located along the first axis so the working portion can cut a workpiece located behind the obstruction.

15 Claims, 11 Drawing Sheets

(58) Field of Classification Search
CPC ......... B24B 23/04; B25F 3/00; A61B 17/128;
Y10T 83/9454; Y10T 83/935; Y10T
83/9457; Y10T 83/7045; Y10T 83/9319
USPC .......................................... 83/835, 848, 697
See application file for complete search history.

(56) References Cited

U.S. PATENT DOCUMENTS

| | | | | |
|---|---|---|---|---|
| 11,324,517 | B2* | 5/2022 | Schaz | ................. A61B 17/142 |
| 2006/0123959 | A1* | 6/2006 | Bocast | ................. B23D 61/025 |
| | | | | 83/13 |
| 2011/0314680 | A1* | 12/2011 | Zhang | ...................... B25F 3/00 |
| | | | | 30/228 |
| 2012/0198709 | A1* | 8/2012 | Inkster | ................. B27B 19/008 |
| | | | | 83/13 |
| 2013/0160631 | A1* | 6/2013 | Nagy | ................. B23D 61/006 |
| | | | | 83/835 |
| 2017/0334006 | A1* | 11/2017 | Inkster | ................. B23D 61/006 |
| 2019/0240752 | A1 | 8/2019 | Churchill | |
| 2019/0319435 | A1* | 10/2019 | Franssen | ............. B23D 61/006 |
| 2019/0337066 | A1* | 11/2019 | Churchill | ............. B23D 61/123 |

FOREIGN PATENT DOCUMENTS

| | | | | |
|---|---|---|---|---|
| EP | 3213847 A1 | 9/2017 | | |
| WO | WO-2012022269 A1 * | 2/2012 | ............. | B23D 61/00 |
| WO | WO-2014195174 A1 * | 12/2014 | ............ | B23D 61/006 |

* cited by examiner

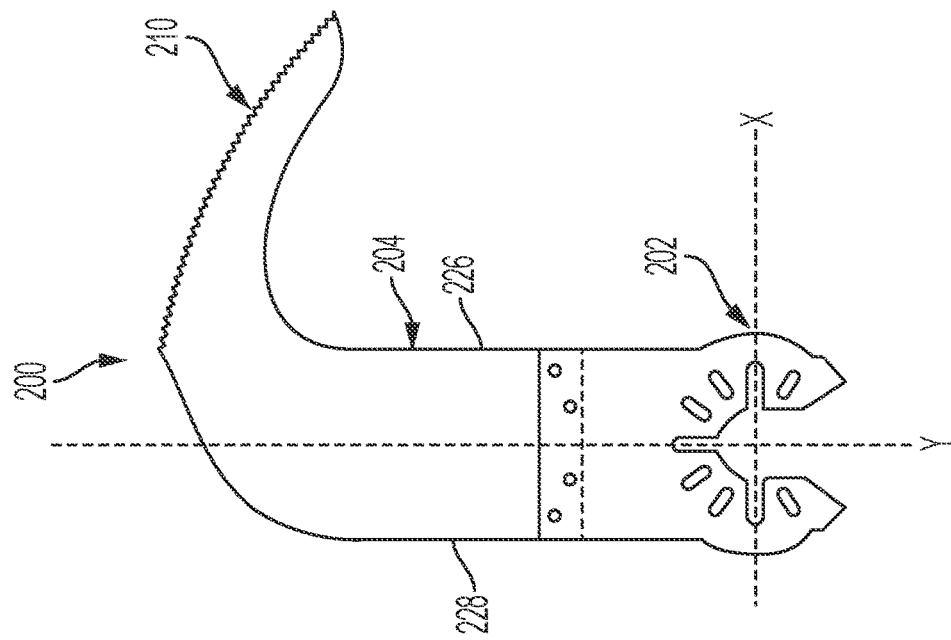
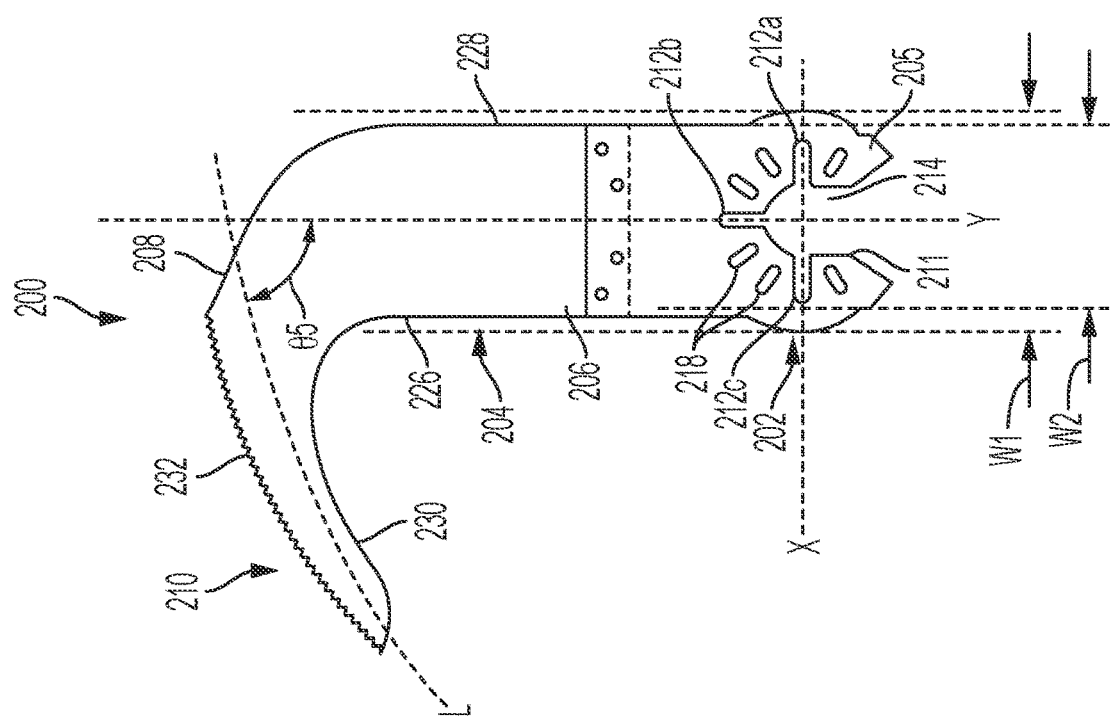

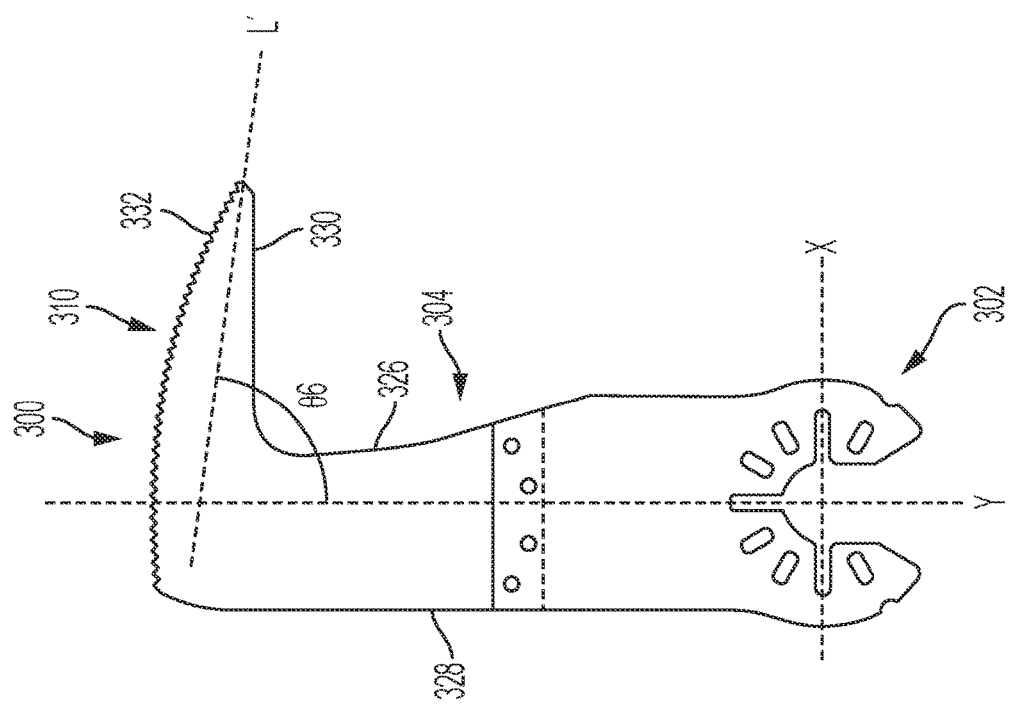
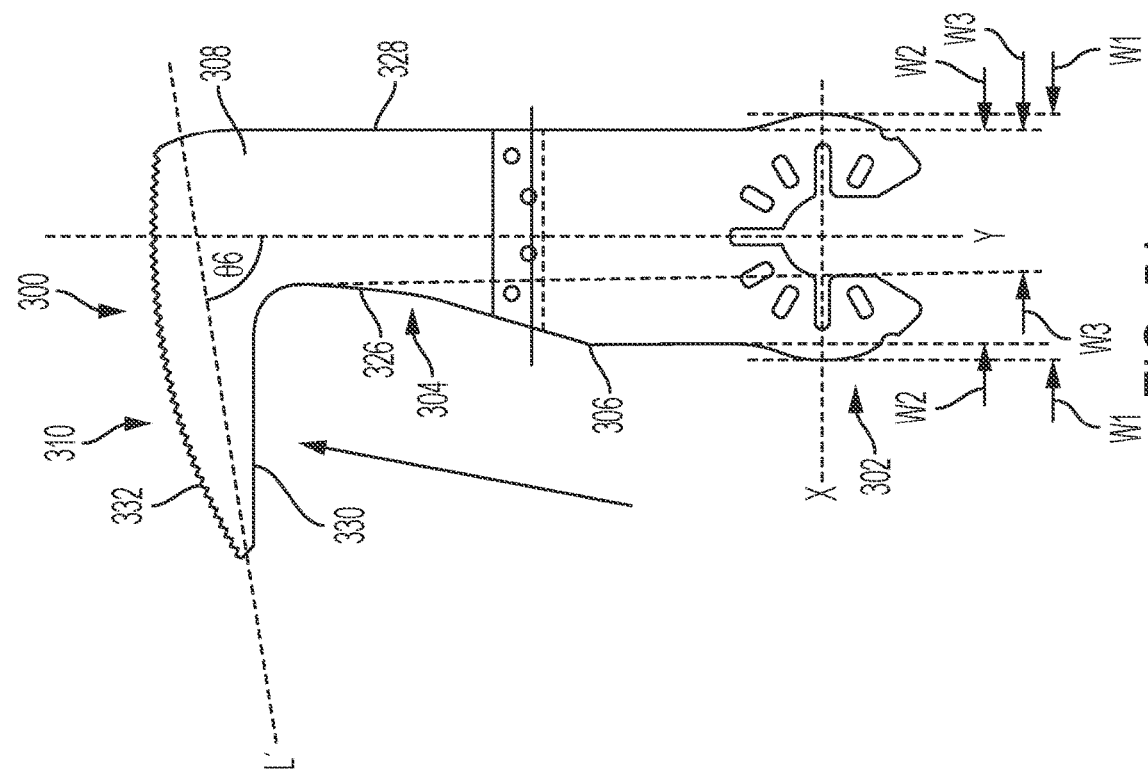
FIG. 5A
FIG. 5B

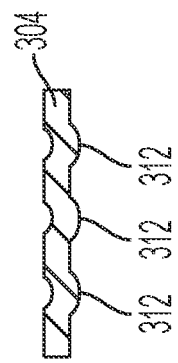
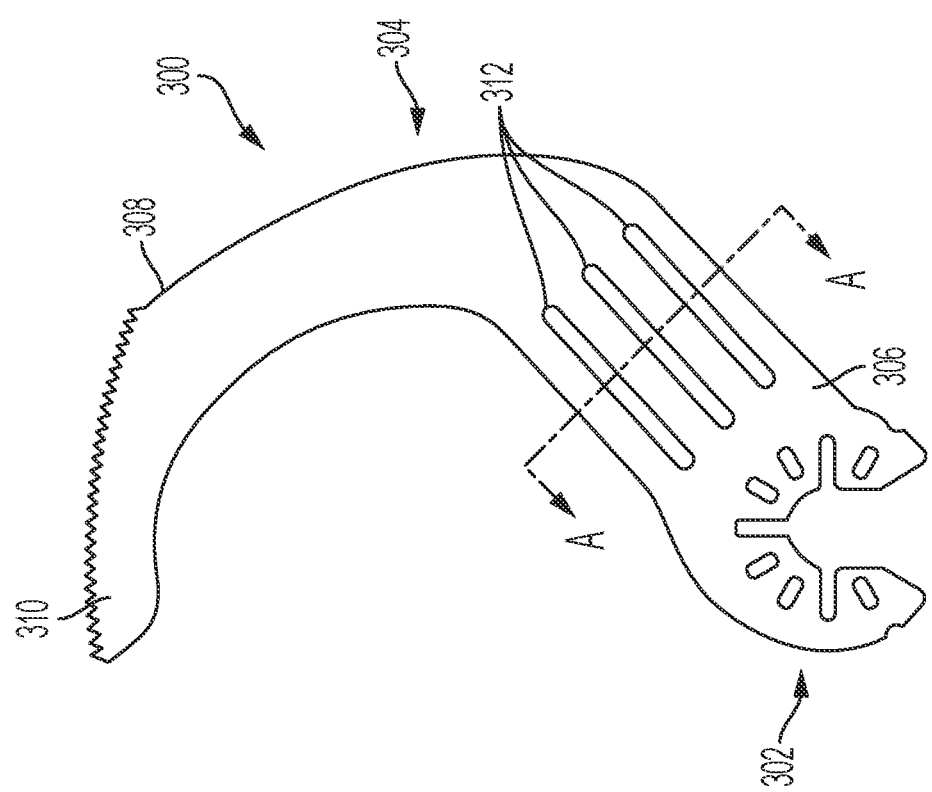
FIG. 6B
FIG. 6A

ACCESSORIES FOR OSCILLATING POWER TOOLS

RELATED APPLICATION

This application claims priority, under 35 U.S.C. § 119(e), to U.S. Provisional Application No. 63/124,298, filed Dec. 11, 2020, titled "Accessories for Oscillating Power Tools," which is incorporated by reference.

TECHNICAL FIELD

This application relates to accessories (such as cutting tools and saw blades) for oscillating power tools.

BACKGROUND

Oscillating power tools generally have a motor, an output shaft, and a transmission that connects the motor to the output shaft and converts rotary motion of the motor to oscillating motion of the output shaft. The output shaft is coupled to an accessory attachment mechanism that is used to removably attach various types of accessories, such as cutting tools, saw blades, and sanding tools, to the output shaft. It is desirable to have oscillating accessories for performing variety of tasks.

SUMMARY

In an aspect, an accessory for an oscillating power tool includes an attachment portion configured to be coupled to an oscillating power tool. The attachment portion defines a plurality of openings including a central opening and a first radial opening extending in a rearward direction from the central opening defining a first axis. The attachment portion has a width along a second axis perpendicular to the first axis. A generally C-shaped intermediate portion has a proximal end portion coupled to the attachment portion, a first portion extending away from the first axis and the second axis to an apex portion outside the width of the attachment portion, and a second portion extending toward the first axis and away from the second axis to a distal end portion. The intermediate portion has a non-cutting first side edge and a non-cutting second side edge. A working end portion is coupled to the distal end portion and extends across the first axis. The working end portion has a non-cutting third side edge continuous with the first side edge and a cutting fourth side edge continuous with the second side edge.

Implementations of this aspect may include one or more of the following features. The cutting fourth side edge may face away from the attachment portion. The cutting fourth side edge may face toward the attachment portion. At least a portion of the cutting fourth side edge may be parallel to the second axis. At least a portion of the cutting fourth side edge may be at an acute angle to the first axis and may extend toward the second axis. The attachment portion may be configured to be reversibly coupled to an oscillating power tool by being turned upside down so that in a first orientation the apex portion extends to the right of the first axis and in a second orientation the apex portion extends to the left of the first axis. The attachment portion, the intermediate portion, and the working end portion may be co-planar. When coupled to an oscillating power tool, the C-shaped intermediate portion may be configured to avoid an obstruction so that the working portion can cut a workpiece located behind the obstruction. The first radial opening may include a U-shaped opening open to a rear end of the attachment portion. The plurality of openings further includes a second radial opening that extends from the central opening at 90 degrees to the first radial opening, a third radial opening that extends from the central opening at 180 degrees to the first radial opening, and a fourth radial opening that extends from the central opening at 270 degrees to the first radial opening. The first portion of the C-shaped intermediate portion may extend to the apex portion from the attachment portion at an acute first angle to the second axis. The second portion of the C-shaped intermediate portion may extend to the distal end portion at an acute second angle to the second axis. A plurality of ribs, dimples, or laminations may be formed in at least one of the attachment portion, the intermediate portion, and the working end portion, the ribs, dimples, or laminations configured to stiffen the accessory during use.

In another aspect, an accessory for an oscillating power tool includes an attachment portion configured to be coupled to an oscillating power tool. The attachment portion defines a plurality of openings including a central opening and a first radial opening extending in a rearward direction from the central opening and defining a first axis. The attachment portion has a first width along a second axis perpendicular to the first axis. An intermediate portion has a proximal end portion coupled to the attachment portion and extending away from the attachment portion along the first axis to a distal end portion. The intermediate portion has a non-cutting first side edge, a non-cutting second side edge, and a second width between the first and second side edges that is less than or equal to the first width. A working portion is coupled to the distal end portion of the intermediate portion and extends away from the first axis at an acute angle to the first axis. The working end portion has a non-cutting third side edge continuous with the first side edge and a cutting fourth side edge continuous with the second non-cutting side edge.

Implementations of this aspect may include one or more of the following features. The cutting fourth edge may face away from the attachment portion. The cutting fourth edge may face toward the attachment portion. The attachment portion may be configured to be reversibly coupled to an oscillating power tool by being turned upside down so that in a first orientation the working portion extends to the right of the first axis and in a second orientation the working portion extends to the left of the first axis. The attachment portion, the intermediate portion, and the working portion may be co-planar. When coupled to an oscillating power tool, the intermediate portion may be configured to avoid an obstruction so that the working portion can cut a workpiece located behind the obstruction. The first radial opening may include a U-shaped opening open to a rear end of the attachment portion. The plurality of openings may include a second radial opening that extends from the central opening at 90 degrees to the first radial opening, a third radial opening that extends from the central opening at 180 degrees to the first radial opening, and a fourth radial opening that extends from the central opening at 270 degrees to the first radial opening. The first and second side edges may be parallel, and the intermediate portion may have a substantially constant width. At least one of the first and second side edges may be angled inward toward the first axis and the intermediate portion may have a width that decreases away from the attachment portion. A plurality of ribs, dimples, or laminations may be formed in at least one of the attachment portion, the intermediate portion, and the working end portion, the ribs, dimples, or laminations configured to stiffen the accessory during use.

In another aspect, an accessory for an oscillating power tool includes an attachment portion configured to be coupled to an oscillating power tool. The attachment portion defines a plurality of openings including a central opening and a first radial opening extending in a rearward direction from the central opening and defining a first axis. An intermediate portion has a proximal end portion coupled to the attachment portion and extending away from the attachment portion to a distal end portion. The intermediate portion has a non-cutting first side edge and a non-cutting second side edge. A working portion is coupled to and extends away from a distal end portion of the intermediate portion at an angle to the intermediate portion and at an angle to the first axis. The working end portion has a non-cutting third side edge continuous with the first side edge and a cutting fourth side edge continuous with the second non-cutting side edge. When coupled to an oscillating power tool, the intermediate portion is configured to avoid an obstruction so that the working portion can cut a workpiece located behind the obstruction.

In another aspect, an accessory for an oscillating power tool includes an attachment portion configured to be coupled to an oscillating power tool. The attachment portion defines a plurality of openings including a central opening and a first radial opening extending in a rearward direction from the central opening and defining a first axis. An intermediate portion has a proximal end portion coupled to the attachment portion and extends away from the attachment portion to a distal end portion. The intermediate portion has a non-cutting first side edge and a non-cutting second side edge. A working portion is coupled to and extends away from a distal end portion of the intermediate portion at an angle to the intermediate portion and at an angle to the first axis. The working end portion has a non-cutting third side edge continuous with the first side edge and a cutting fourth side edge continuous with the second non-cutting side edge. The attachment portion is configured to be reversibly coupled to an oscillating power tool by being turned upside down so that in a first orientation the working portion extends to the right of the first axis and in a second orientation the working portion extends to the left of the first axis.

Advantages may include one or more of the following. The accessories disclosed in this application may be configured to avoid an obstruction so that the working portion can cut a workpiece located behind the obstruction. In addition, the oscillating accessories may be configured to be reversibly coupled to an oscillating power tool by being turned upside down so that in a first orientation the working portion extends to the right of the first axis and in a second orientation the working portion extends to the left of the first axis, enabling avoiding obstructions to the left and the right. These and other advantages and features will be apparent from the description, the drawings, and the claims.

BRIEF DESCRIPTION OF THE DRAWINGS

FIGS. 4A and 4B are top and bottom views of another implementation of an oscillating accessory.

FIGS. 5A and 5B are top and bottom views of another implementation of an oscillating accessory.

FIG. 6A is a top view of another implementation of an oscillating accessory.

FIG. 6B is a partial cross-sectional view of the accessory of FIG. 6A taken along line A-A.

DETAILED DESCRIPTION

Figure 1A:
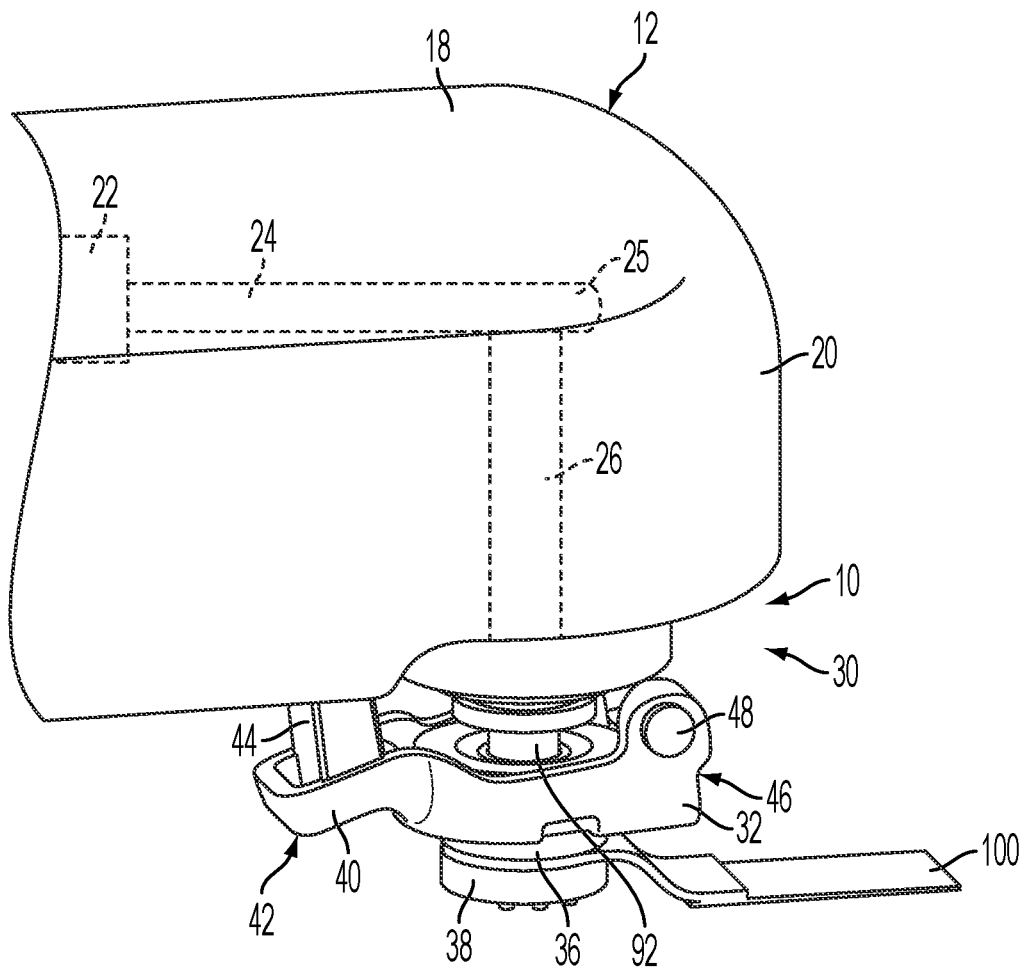
FIG. 1A is a perspective view an oscillating power tool having an implementation of an accessory attachment mechanism.
Figure 1B:
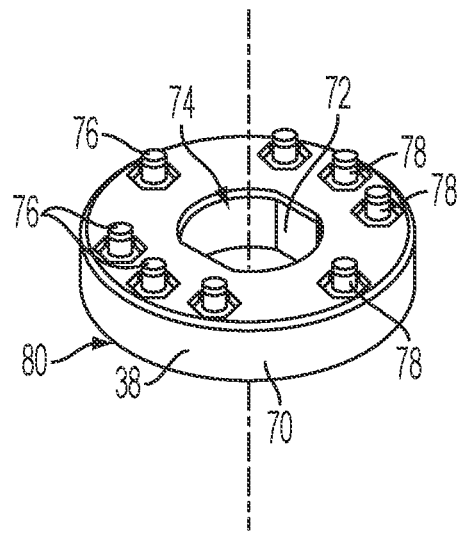
FIG. 1B a perspective view of a clamping plate of the attachment mechanism of FIG. 1A.

Referring to FIGS. 1A and 1B, in an implementation, an oscillating power tool 12 usable with the accessories described in this application is similar to oscillating power tools sold under the brand names DEWALT® and Porter-Cable® and is described further in U.S. Pat. No. 8,925,931, which is hereby incorporated by reference. The power tool 12 includes a tool body 18 including a housing 20 that contains a motor 22 to drive an output member 24. An output spindle 26 is coupled to the motor 22 via a transmission 25 that converts rotary motion of the motor 22 to oscillating motion of the spindle 26. The output of the spindle 26 is coupled to an accessory attachment mechanism 10 via an output shaft 92. The accessory attachment mechanism 10 does not require the use of a separate tool to couple an accessory or blade (such as the accessory 100 shown in FIGS. 2-3, as described below) to the oscillating power tool (also known as a "tool-free" attachment mechanism). An exemplary tool-free attachment mechanism 10 includes a clamp assembly 30 having a first clamp member 36 fixedly coupled to the output spindle, a second clamp member 38 facing the first clamp member 36, and a lever 32 coupled to the second clamp member 38. The lever 32 includes a lever arm 40 with a user engagement portion 42 and a block 44. The lever 32 further includes a pivot portion 46 having a pivot axle 48. The second clamp member 38 includes a second clamp body 70 generally in the form of a ring having a central opening 72. The second clamp body 70 has a second clamping surface 74 having a plurality of mounting features 76 formed thereon. In the example shown, the plurality of mounting features 76 are in the form of male projections 78. In the particular example shown, the eight male projections 78 each have a circular cross section and a tapered shape or form. In another related implementation, the male projections may have an oblong, oval, or rectangular cross-section and may also be tapered. In other implementations, the accessory 100 described below may be configured for use with or adapted for use with other oscillating power tools and accessory mounting mechanisms for oscillating power tools, such as those disclosed in U.S. patent application Ser. Nos. 16/511,043; 15/893,610; 15/253,559; 15/065,024; 14/909,233; 14/909,247; and Ser. No. 12/798,997; and U.S. Pat. Nos. 10,350,721; 10,137,592; 10,040,215; 9,670,998; 9,272,435; 9,346,183; 8,585,469; 8,182,316, each of which is incorporated by reference.

Figure 2:
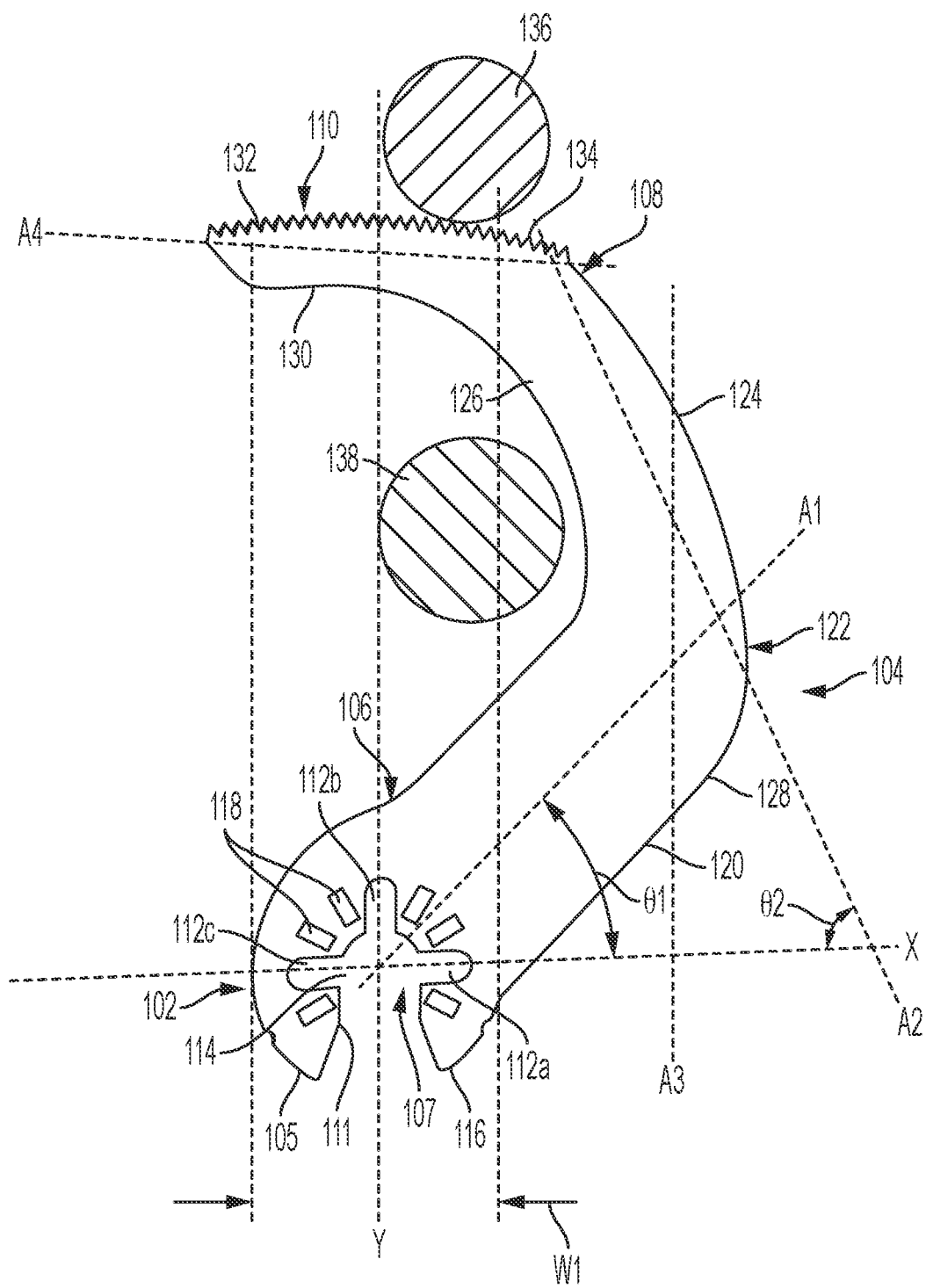
FIG. 2 is a top view of an implementation of an oscillating accessory.
Figure 3:
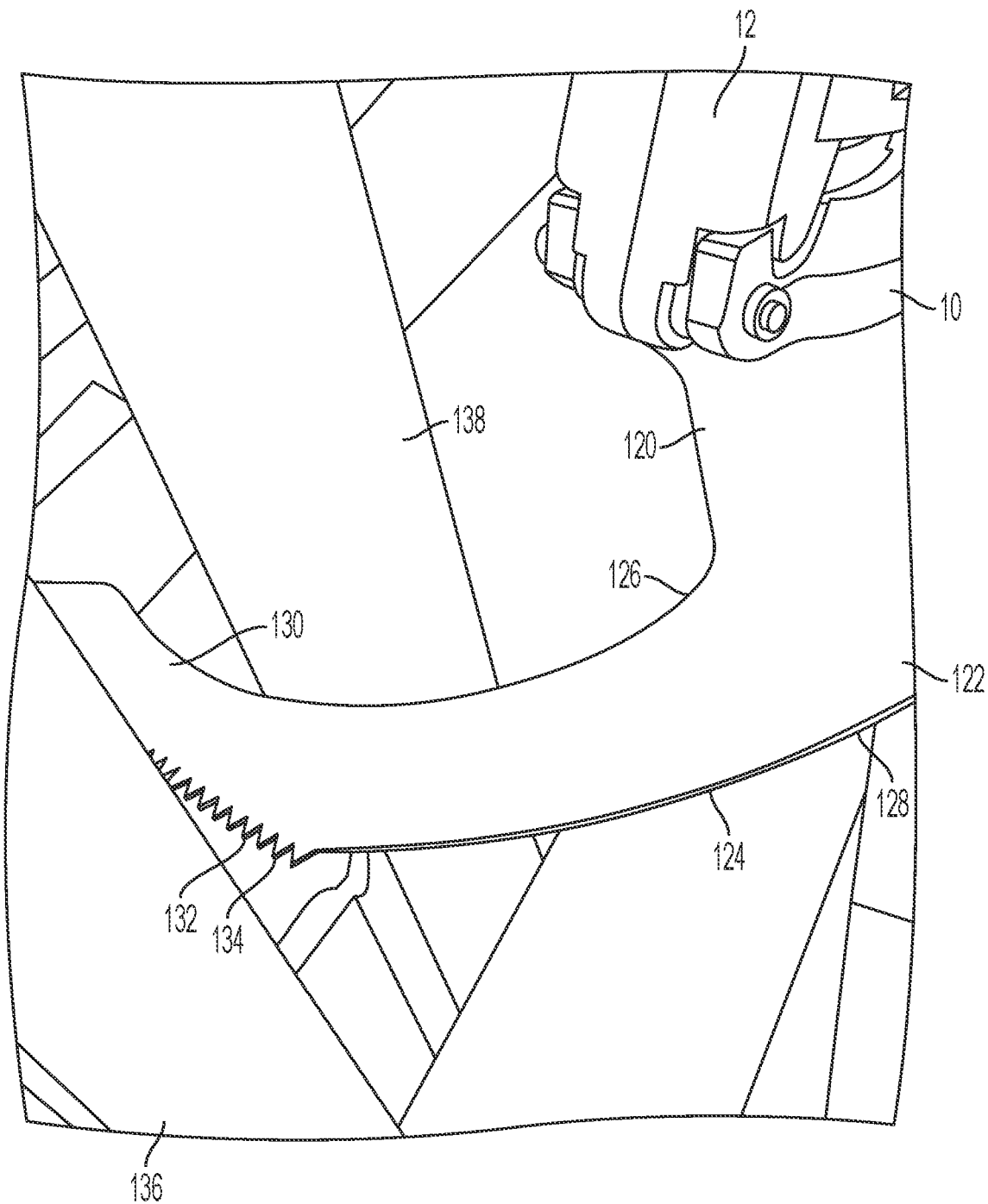
FIG. 3 is a perspective view showing the oscillating accessory of FIG. 2 being used to cut a workpiece.

Referring also to FIGS. 2-3, an implementation of an oscillating accessory 100 includes an attachment portion 102, an intermediate portion 104 having a proximal end portion 106 coupled to the attachment portion 102 and a distal end portion 108, and a working portion 110 coupled to the distal end portion 108 of the intermediate portion 104. The attachment portion 102 is configured to be coupled to an oscillating power tool. In one implementation, the attachment portion 102 includes a generally planar portion 105 lying generally in a plane. Defined in the generally planar portion 105 are a plurality of recesses or openings 107 configured to couple the accessory 100 to an attachment mechanism of an oscillating power tool, such as the attachment mechanism 10 of the oscillating power tool 12 described above or the other attachment mechanisms for oscillating power tools incorporated by reference and listed above.

The plurality of openings 107 may include a central opening 114, a generally U-shaped first radial opening 111 extending from the central opening 114 and open to a rear end portion 116 of the attachment portion 102. A first set of three radial arm openings 112a, 112b, 112c are in communication with and extend radially outward from the central portion opening 114 at approximately 90°, approximately 180°, and approximately 270°, respectively, relative to the U-shaped opening 111. The U-shaped opening 111 and the radial arm slot 112b together define a first axis Y. The radial arm slots 112a, 112c together define a second axis X that is perpendicular to the first axis Y. The attachment portion 114 is generally circular and has a first width W1 or diameter along the second axis X.

The attachment portion 102 also may define a second set of six radial openings 118 are spaced radially outward from and not in communication with the central opening 114, and are positioned at approximately 60°, approximately 120°, approximately 150°, approximately 210°, approximately 240°, and approximately 300° relative to the U-shaped opening 111. This configuration enable the attachment portion to be coupled to a wide variety of brands of power tools. In other implementations, the attachment portion may have a configuration similar to those shown, e.g., in U.S. Pat. Nos. 10,245,716 and 10,265,778, which are incorporated by reference. In certain implementations, the attachment portion may be universal or nearly universal and/or may be coupleable to two or more the oscillating power tools described and incorporated by reference above.

The intermediate portion 104 is generally C-shaped and includes a first portion 120 that extends away from the first axis and the second axis to an apex or elbow portion 122 outside the width W1 of the attachment portion 102 and then back toward the first axis, and a second portion 124 that extends from the apex portion 122 to the distal end portion 108 back toward the first axis Y and away from the second axis X. The intermediate portion 104 has non-cutting first and second side edges 126, 128 along substantially an entirety of the intermediate portion 104. At the apex portion 122, the first and second side edges 126, 128 are at their maximum distance from the first axis Y and are both outside the width W1 of the attachment portion 102. Each of the first portion 120, the apex portion 122, and the second portion 124 may be straight, curved, or curvilinear. Alternatively, in each of the first edge 126 of the first portion 120, the apex portion 122, and the second portion 124 may be one of straight, curved, or curvilinear, while the second side edge 128 maybe another of straight, curved, or curvilinear. For example, the first portion 120 may extend generally along a first portion axis A1 that is at an acute first angle θ1 to the second axis X. The second portion 124 may extend generally along a second portion axis A2 that is at an acute second angle θ2 to the second axis X. The apex portion 122 may extend generally along an apex portion axis A3 that may be generally parallel to the first axis Y and generally perpendicular to the second axis X.

The working end portion 110 is coupled to the distal end portion 108 of the intermediate portion 104 and extends away from the intermediate portion 104 toward and across the first axis Y. The working end portion 110 has a non-cutting third side edge 130 continuous with the first side edge 126 and a cutting fourth side edge 132 with a plurality of teeth 134 continuous with the second non-cutting side edge 128. In the illustrated embodiment in FIGS. 2 and 3, the cutting fourth edge 132 faces away from the attachment portion 102 to facilitate "push-cutting" in which a user exerts a pushing force on the attachment portion toward the working portion along the first axis Y when cutting a workpiece 136. In another implementation, the non-cutting third edge 130 and the cutting fourth edge 132 may be reversed on the working portion 110 so that the cutting fourth edge 132 faces toward the attachment portion 102. This facilitates "pull cutting" in which a user exerts a pulling force on the attachment portion from the working portion along the first axis Y when cutting a workpiece. The working portion 110, the non-cutting third side edge 130, and the cutting fourth side edge 132 each may be one of straight, curved, or curvilinear. For example, the working portion 110 may extend generally along a fourth axis A4 that is at an acute first angle θ4 to the second axis X or that is parallel to the second axis X.

The C-shape of the intermediate portion 104 that connects the attachment portion 102 and the working portion 110 enables the working portion 110 to be used to cut a workpiece 136 that is hidden behind an obstruction 138 by allowing the C-shaped intermediate portion 104 to avoid or wrap around the obstruction 138. In addition, the accessory 100 also may be configured to be reversible by turning the accessory 100 upside down so that in a first orientation the apex portion 122 is to the right of the first axis Y (as shown in FIG. 2 and in a second orientation the apex portion 122 is to the left of the first axis Y. For example, the attachment portion, the intermediate portion, and the working portion may be co-planar to facilitate easy reversibility of the accessory. In other implementations, the attachment portion and the working portion may lie in planes that are parallel, transverse, of offset from one another.

Referring to FIGS. 4A-4B, in another implementation, an oscillating accessory 200 includes an attachment portion 202, an intermediate portion 204 having a proximal end portion 206 coupled to the attachment portion 202 and a distal end portion 208, and a working portion 210 coupled to the distal end portion 208 of the intermediate portion 204. The attachment portion 202 is configured to be coupled to an oscillating power tool. In one implementation, the attachment portion 202 includes a generally planar portion 205 lying generally in a plane. Defined in the generally planar portion 205 are a plurality of recesses or openings 207 configured to couple the accessory 200 to an attachment mechanism of an oscillating power tool, such as the attachment mechanism 10 of the oscillating power tool 12 described above or the other attachment mechanisms for oscillating power tools incorporated by reference and listed above.

The plurality of openings 207 may have the substantially the same configuration as the openings 107 described above. For example, the openings 206 may include a central opening 214, a generally U-shaped first radial opening 211 extending from the central opening 214 and open to a rear end portion 216 of the attachment portion 202. A first set of three radial arm openings 212a, 212b, 212c are in communication with and extend radially outward from the central portion opening 214 at approximately 90°, approximately 180°, and approximately 270°, respectively, relative to the U-shaped opening 211. The U-shaped opening 211 and the radial arm slot 212b together define a first axis Y. The radial arm slots 212a, 212c together define a second axis X that is perpendicular to the first axis Y. The attachment portion 114 is generally circular and has a first width W1 or diameter along the second axis X.

The attachment portion 202 also may define a second set of six radial openings 218 are spaced radially outward from and not in communication with the central opening 114, and are positioned at approximately 60°, approximately 120°, approximately 150°, approximately 210°, approximately 240°, and approximately 300° relative to the U-shaped opening 211. This configuration enable the attachment portion to be coupled to a wide variety of brands of power tools. In other implementations, the attachment portion may have a configuration similar to those shown, e.g., in U.S. Pat. Nos. 10,245,716 and 10,265,778, which are incorporated by reference. In certain implementations, the attachment portion may be universal or nearly universal and/or may be coupleable to two or more the oscillating power tools described and incorporated by reference above.

The intermediate portion 204 extends away from the attachment portion 202 along the first axis Y and has a second width W2 that is less than or equal to the first width W1. The intermediate portion 204 has non-cutting first and second side edges 226, 228. Each of the intermediate portion 204, the first side edge 226, and the second side edge 228 may be straight, curved, or curvilinear. In the illustrated embodiment, the first and second side edges 226, 228 are substantially parallel and the second width W2 of the intermediate portion 204 is substantially constant along its length.

The working portion 210 is coupled to the distal end portion 208 of the intermediate portion 204 and extends away from first axis Y. The working portion 210 may extend generally along a straight, curved, or curvilinear line L at an angle θ5 where it intersects the first axis Y. The angle θ5 may be 90° or less to the first axis Y. The angle between the line L and the first axis Y may decrease as the working portion extends away from the first axis Y such that the working portion 210 is angled or curved toward the second axis X. The working end portion 210 has a cutting third side edge 230 continuous with the first side edge 226 and a non-cutting fourth side edge 232 continuous with the second non-cutting side edge 228. In the illustrated embodiment in FIGS. 4A-4B, the cutting third edge 232 faces toward the attachment portion 202. This facilitates "pull cutting" in which a user exerts a pulling force on the attachment portion from the working portion along the first axis Y when cutting a workpiece. Alternatively, the cutting third edge 230 and the non-cutting fourth edge 232 may be reversed so that the cutting edge 232 faces away from the attachment portion 202. This facilitates "push-cutting" in which a user exerts a pushing force on the attachment portion toward the working portion along the first axis Y when cutting a workpiece 236. The working portion 210, the cutting third side edge 230, and the cutting fourth side edge 232 each may be one of straight, curved, or curvilinear.

The configuration of the accessory 200 enables the working portion 210 to be used to cut a workpiece that is hidden behind an obstruction by allowing the working portion 210 to avoid or wrap around and behind the obstruction. In addition, as shown in FIG. 4B, the accessory 200 also is configured to be reversible by turning the accessory 200 upside down so that in a first orientation (FIG. 4A), the working portion 210 extends to the left of the first axis Y, and in a second orientation (FIG. 4B), the working portion 210 is to the right of the first axis Y. For example, the attachment portion, the intermediate portion, and the working portion may be co-planar to facilitate easy reversibility of the accessory.

Figure 4C:
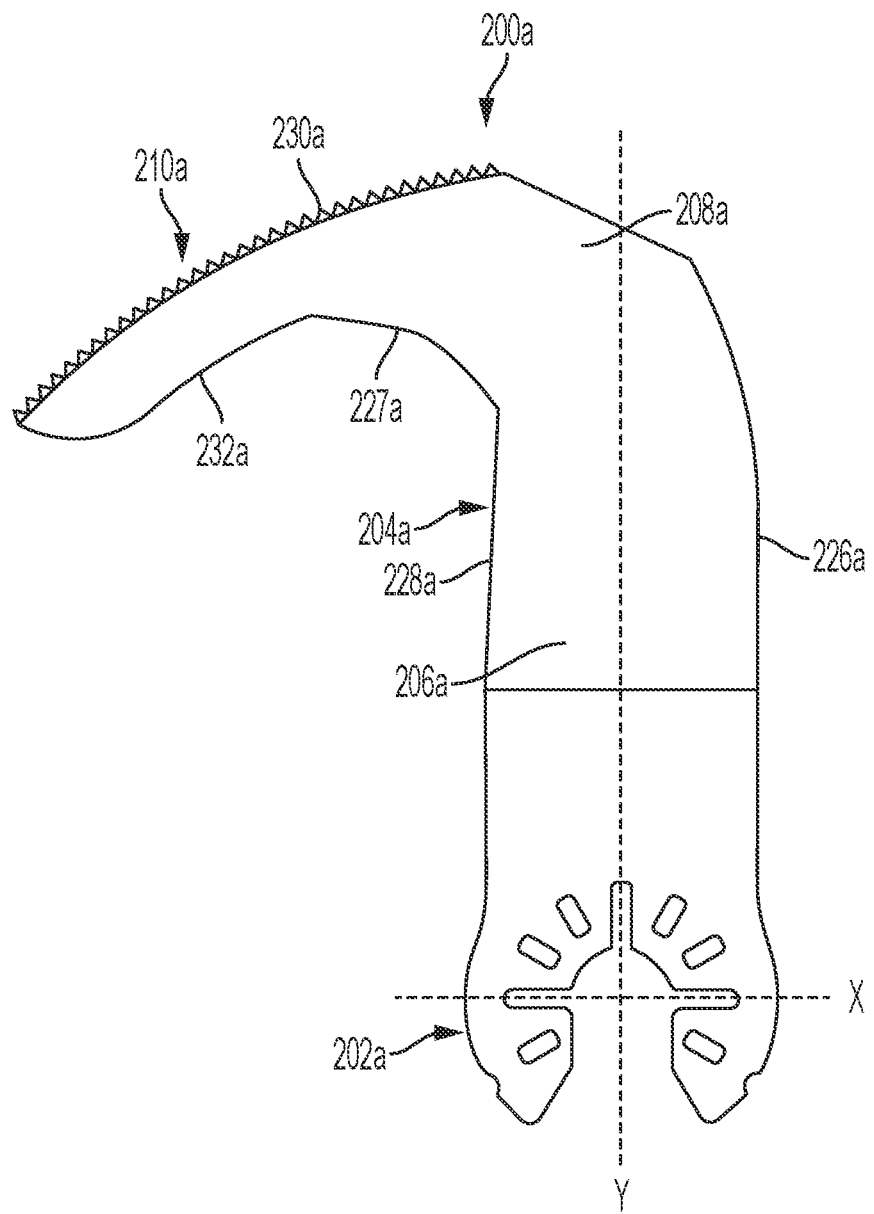
FIG. 4C is a top view of another implementation of an oscillating accessory.

Referring to FIG. 4C, in another implementation, an oscillating accessory 200a includes an attachment portion 202a; an intermediate portion 204a with a proximal end portion 206a coupled to the attachment portion 202a, a distal end portion 208a, and first and second side edges 226a, 228a; and a working portion 210a coupled to the distal end portion 208a of the intermediate portion 204a with a third cutting side edge 230a facing away from the attachment portion 202a and a fourth non-cutting side edge 232a facing toward the attachment portion 202a. The features of the oscillating accessory 200a are substantially similar to similar features of the oscillating accessory 200 described above, except for the following differences. The oscillating accessory 200a includes a concave edge 227a joining the second side edge 228a and the fourth side edge 232a, with the concave edge 227a having a larger radius of curvature than a corresponding concave side edge 227 in the oscillating accessory 200. This larger radius of curvature helps reduce stress concentrations and improve the stiffness and durability of the oscillating accessory 200a.

Figure 4D:
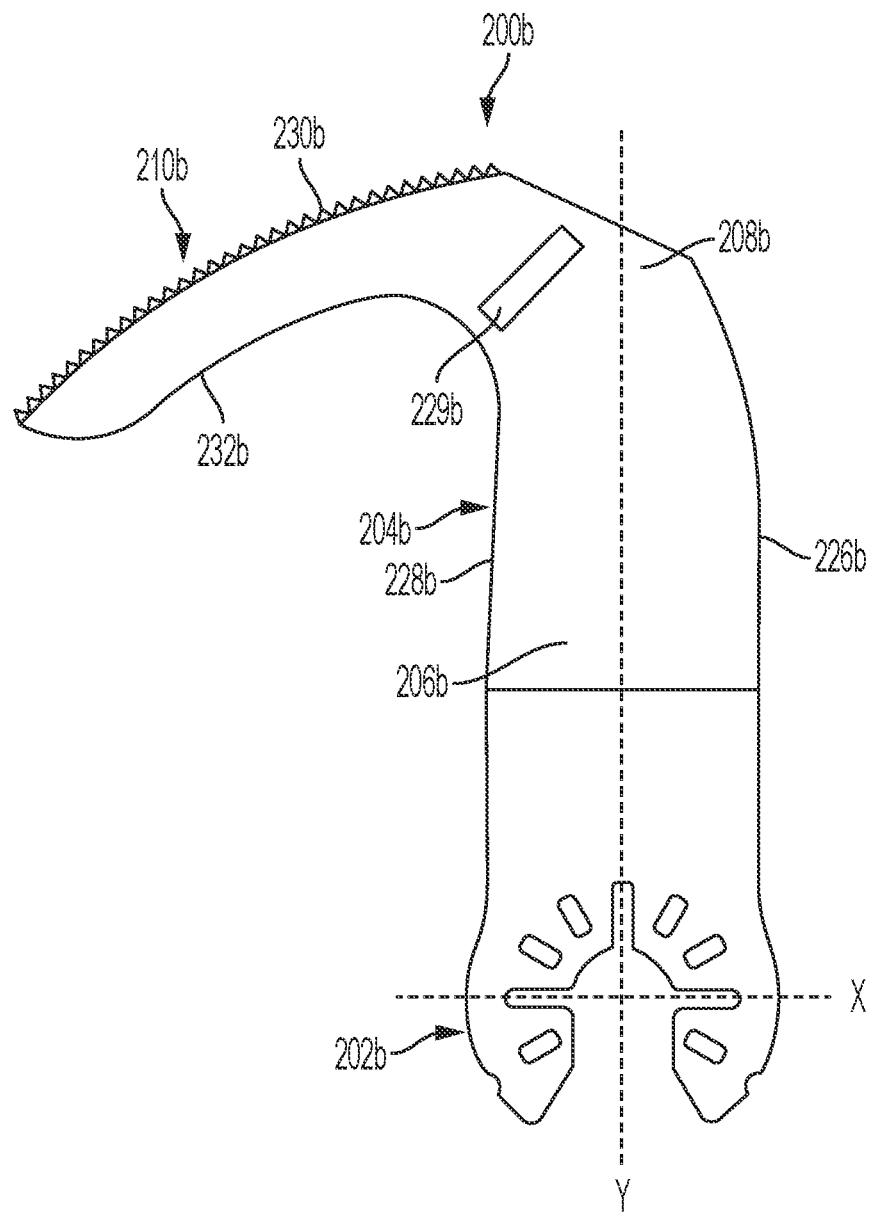
FIG. 4D is a top view of another implementation of an oscillating accessory.

Referring to FIG. 4D, in another implementation, an oscillating accessory 200b includes an attachment portion 202b; an intermediate portion 204b with a proximal end portion 206b coupled to the attachment portion 202b, a distal end portion 208b, and first and second side edges 226b, 228b; and a working portion 210b coupled to the distal end portion 208b of the intermediate portion 204b with a third cutting side edge 230b facing away from the attachment portion 202b and a fourth non-cutting side edge 232b facing toward the attachment portion 202b. The features of the oscillating accessory 200b are substantially similar to similar features of the oscillating accessory 200 described above, except for the following differences. The oscillating accessory 200b includes one or more ribs, dimples, or laminations 229b proximate a junction region between the intermediate portion 204b and the working portion 210b. The one or more ribs, dimples, or laminations 229b improve the stiffness and durability of the oscillating accessory 200b.

Figure 4E:
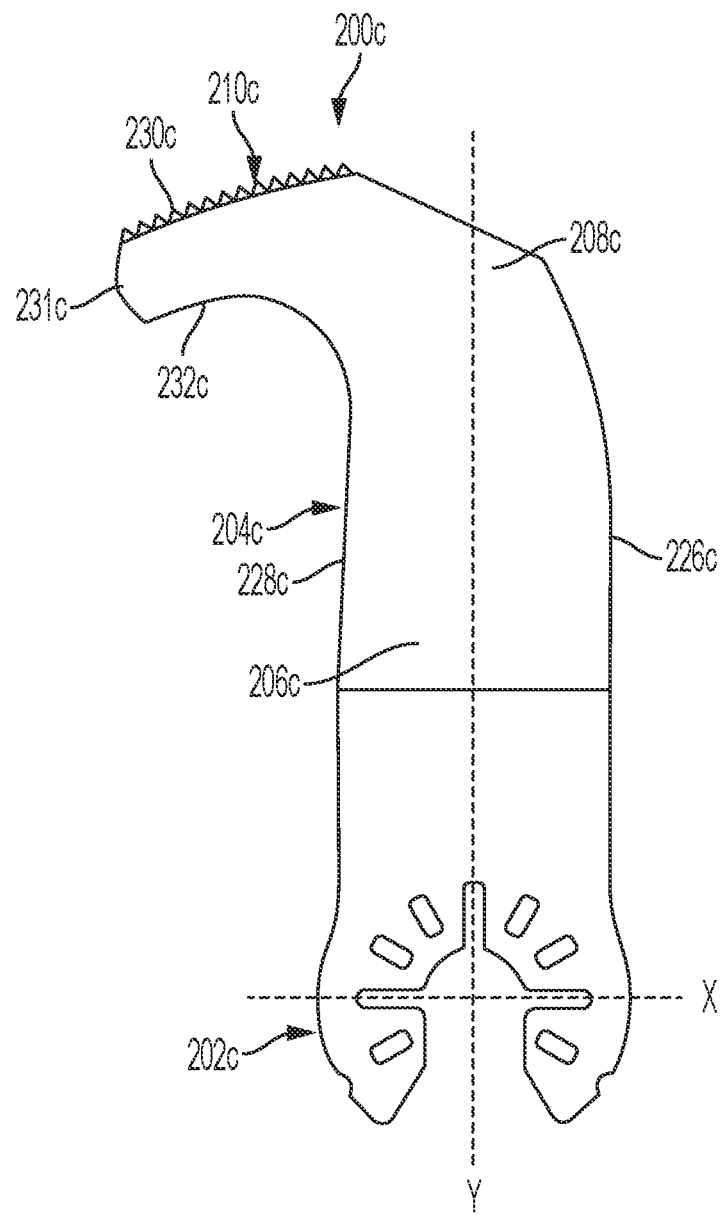
FIG. 4E is a top view of another implementation of an oscillating accessory.

Referring to FIG. 4E, in another implementation, an oscillating accessory 200c includes an attachment portion 202c; an intermediate portion 204c with a proximal end portion 206c coupled to the attachment portion 202c, a distal end portion 208c, and first and second side edges 226c, 228c; and a working portion 210c coupled to the distal end portion 208c of the intermediate portion 204c with a third cutting side edge 230c facing away from the attachment portion 202c and a fourth non-cutting side edge 232c facing toward the attachment portion 202c. The features of the oscillating accessory 200c are substantially similar to similar features of the oscillating accessory 200 described above, except for the following differences. The oscillating accessory 200c has a shorter working portion 210c with a terminal end 231c closer to the Y-axis than the oscillating accessory 200. The shorter working portion 210c improves the stiffness and durability of the oscillating accessory 200c.

Figure 4F:
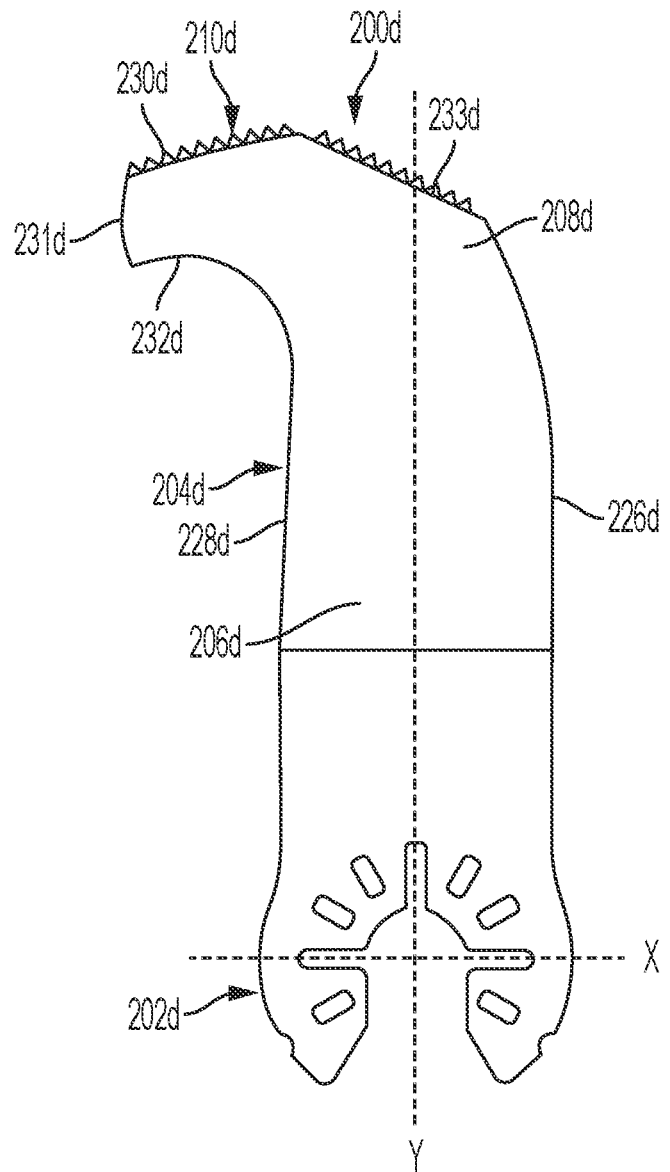
FIG. 4F is a top view of another implementation of an oscillating accessory.

Referring to FIG. 4F, in another implementation, an oscillating accessory 200d includes an attachment portion 202d; an intermediate portion 204d with a proximal end portion 206d coupled to the attachment portion 202d, a distal end portion 208d, and first and second side edges 226d, 228d; and a working portion 210d coupled to the distal end portion 208d of the intermediate portion 204d with a third cutting side edge 230d facing away from the attachment portion 202d and a fourth non-cutting side edge 232d facing toward the attachment portion 202d. The features of the oscillating accessory 200d are substantially similar to similar features of the oscillating accessory 200c described above, except for the following differences. The oscillating accessory 200d has a secondary cutting edge 233d between the third cutting side edge 230d and the first side edge 226d. The secondary cutting edge 233d may have teeth with a different configuration (e.g., a different tooth pitch, rake angle, relief angle, or set pattern) or a made of a different material (e.g., bi-metal, carbide) than the teeth on the third cutting side edge 230d. This allows for cutting more or different materials and enables a larger cutting region.

Figure 4G:
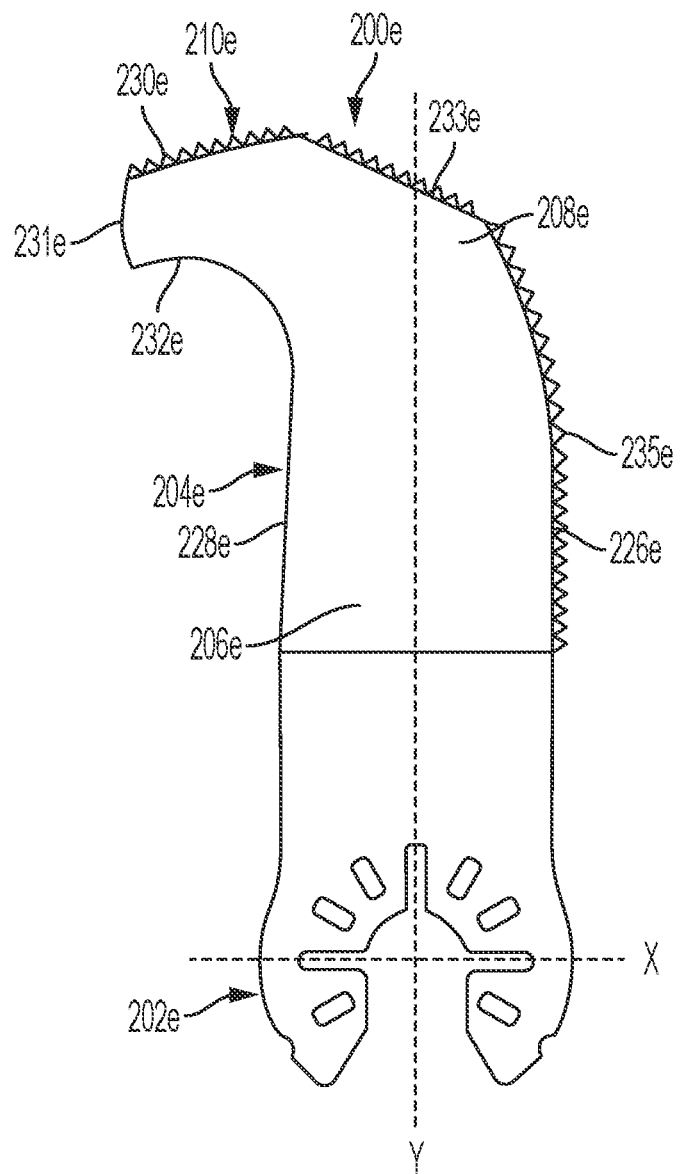
FIG. 4G is a top view of another implementation of an oscillating accessory.

Referring to FIG. 4G, in another implementation, an oscillating accessory 200e includes an attachment portion 202e; an intermediate portion 204e with a proximal end portion 206e coupled to the attachment portion 202e, a distal end portion 208e, and first and second side edges 226e, 228e; a working portion 210e coupled to the distal end portion 208e of the intermediate portion 204e with a third cutting side edge 230e facing away from the attachment portion 202e and a fourth non-cutting side edge 232e facing toward the attachment portion 202e; and a secondary cutting edge 233e between the third cutting side edge 230e and the first side edge 226e. The features of the oscillating accessory 200e are substantially similar to similar features of the oscillating accessory 200d described above, except for the following differences. The first side edge 228e comprises a tertiary cutting edge 235e. The tertiary cutting edge 235e may have teeth with a different configuration (e.g., a different tooth pitch, rake angle, relief angle, or set pattern) or a made of a different material (e.g., bi-metal, carbide) than the teeth on the third cutting side edge 230d and/or the secondary cutting edge 233e. This allows for cutting more or different materials and enables a larger cutting region.

Referring to FIGS. 5A-5B, in another implementation, an oscillating accessory 300 includes an attachment portion 302, an intermediate portion 304, and a working portion 310 that are substantially similar to the attachment portion 202, intermediate portion 204, and working portion 210 of FIGS. 4A-4B, except for the following differences. Unlike the intermediate portion 204 of FIGS. 4A-4B, the intermediate portion 304 of FIGS. 5A-5B does not have substantially constant second width W2 (which is less than the first width W1 of the attachment portion 202). Instead, the intermediate portion 304 tapers from a second width W2 at a first end portion 306 adjacent the attachment plate (which is less than the first width W1 of the attachment portion 302) to a third width W3 at a second end portion 308 adjacent the working portion 310 (which is less than the second width W2). Also, the non-cutting first side edge 326 is angled toward the non-cutting second side edge 328 instead of being parallel like side edges 226, 228 in FIGS. 4A-4B. Further, unlike the curved or curvilinear cutting fourth edge 230 of FIGS. 4A-4B that is angled toward the second axis X, the cutting fourth edge 330 of FIGS. 5A-5B is straight and generally parallel to the second axis X, with the overall working portion 310 angled relative to the first axis Y at an acute angle θ6. Other features of the oscillating accessory 300 of FIGS. 5A-5B are similar to those of the oscillating accessory 200 of FIGS. 4A-4B.

In other implementations, one or more ribs, dimples, or laminations may be added to one or more surfaces or portions of each of the above-described oscillating accessories 100, 200, to facilitate the accessories being more structurally stiff during use. For example, as shown in FIGS. 6A and 6B, in an implementation, an oscillating accessory 300, similar to oscillating accessory 100, includes an attachment portion 302, an intermediate portion 304 having a proximal end portion 306 coupled to the attachment portion 302 and a distal end portion 308, and a working portion 310 coupled to the distal end portion 308 of the intermediate portion 304. The oscillating accessory 300 differs from the oscillating accessory 100 in that it further includes a plurality of ribs 312 formed in the intermediate portion 304 to make the accessory 300 more structurally stiff during use. The ribs may be formed, e.g., by stamping, cold forming, hot working, attaching laminations to the surface of the blade, or other known manufacturing processes. The ribs, dimples, or laminations are illustrated as being three in number and parallel to the side edges of the intermediate portion. However, the ribs, dimples, or laminations may have a myriad of different numbers, shapes, and sizes and may be positioned at other locations on the accessories. Similar types of ribs, dimples, or laminations may also be incorporated into the other accessories disclosed in this application.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. An accessory for an oscillating power tool comprising:
   an attachment portion with a plurality of openings configured to be coupled to an oscillating power tool, the attachment portion defining a first axis generally parallel to a power tool axis of the oscillating power tool when the accessory is coupled to the oscillating power tool and having a first width defined transverse to the first axis;
   an intermediate portion extending along the first axis from a proximal end portion coupled to the attachment portion to a distal end portion to present a first side edge and a second side edge, the intermediate portion being substantially flat between the proximal and distal end portions, the proximal end portion extending generally linearly from the attachment portion and having a second width defined transverse to the first axis, the second width being less than the first width; and a working portion coupled to the distal end portion;
   and extending to a working tool end portion, the working portion pointing away from the first axis in a direction from the distal end portion to the working tool end portion, the working portion having a third side edge continuous with the first edge, and a fourth side edge continuous with the second side edge, the third side edge having a cutting edge portion disposed entirely on the one side of the first axis,
   wherein at least a portion of the cutting edge is at an acute angle to the first axis and extends toward a second axis that is perpendicular to the first axis and extends through the attachment portion, and
   wherein the third side edge is farther from the second axis than the fourth side edge, such that the cutting edge portion faces away from the attachment portion.

2. The accessory of claim 1, further comprising a secondary cutting edge portion disposed between the cutting edge portion and the first side edge.

3. The accessory of claim 2, wherein the first side edge includes a tertiary cutting edge portion.

4. The accessory of claim 1, wherein the attachment portion is configured to be reversibly coupled to the oscillating power tool by being turned upside down so that in a first orientation the cutting edge portion is disposed on a right side of the first axis and in a second orientation the cutting edge portion is disposed on a left side of the first axis.

5. The accessory of claim 1, wherein, when coupled to the oscillating power tool, the working portion is configured to cut a workpiece located behind an obstruction while avoiding cutting the obstruction.

6. The accessory of claim 1, wherein the plurality of openings include a central opening having a central portion and a first radial opening extending from the central portion along the first axis.

7. The accessory of claim 6, wherein the plurality of openings additionally include a pair of second radial openings each extending along the second axis from opposite sides of the central opening.

8. The accessory of claim 7, wherein the plurality of openings additionally include a set of spaced radial openings being spaced radially outward from and not in communication with the central opening and each respectively positioned circumferentially between adjacent ones of said first and second radial openings.

9. The accessory of claim 1, further comprising one or more ribs, dimples, or laminations formed on at least one of the intermediate portion and the working portion, the ribs, dimples, or laminations configured to increase stiffness of the accessory.

10. The accessory of claim 1, wherein at least one of the first side edge or the second side edge is at least partially curved.

11. The accessory of claim 10, wherein, when coupled to an oscillating power tool, the intermediate portion is configured to wrap at least partially around an obstruction located along the first axis so that the working portion can cut a workpiece located behind the obstruction.

12. The accessory of claim 10, further comprising one or more ribs, dimples, or laminations formed on at least one of the intermediate portion and the working portion, the ribs, dimples, or laminations configured to increase stiffness of the accessory.

13. The accessory of claim 10, wherein the intermediate portion includes a first portion extending away from the first axis and from the second axis to an apex portion, wherein the apex portion is disposed on the one side of the first axis.

14. The accessory of claim 1, wherein the fourth side edge is a non-cutting edge.

15. The accessory of claim 1, wherein the intermediate portion includes a first portion extending away from the first axis and from the second axis to an apex portion disposed on the one side of the first axis.

* * * * *